US012801097B2

(12) United States Patent
Ali et al.

(10) Patent No.: US 12,801,097 B2
(45) Date of Patent: Nov. 17, 2026

(54) SYSTEM AND METHOD FOR AI/ML BASED CLOSED LOOP AUTOMATIC REGULATION OF EMISSIONS

(71) Applicant: HPCL-Mittal Energy Limited, Noida (IN)

(72) Inventors: Siddiqui Md Ghazunfer Ali, Bathinda (IN); Amit Gupta, Haryana (IN); Vivek Kumar Khanna, Bathinda (IN); Amit Kumar, Bathinda (IN); Gaurav Gaba, Haryana (IN); Rajeev Roy Chowdhury, West Bengal (IN); Vimal Goel, Delhi (IN); Somendra Jaswal, Noida (IN)

(73) Assignee: HPCL-Mittal Energy Limited, Noida (IN)

( * ) Notice: Subject to any disclaimer, the term of this patent is extended or adjusted under 35 U.S.C. 154(b) by 296 days.

(21) Appl. No.: 18/647,464

(22) Filed: Apr. 26, 2024

(65) Prior Publication Data

US 2024/0393749 A1 Nov. 28, 2024

(30) Foreign Application Priority Data

Nov. 24, 2023 (IN) ............................ 202311080036

(51) Int. Cl.
*G05B 13/02* (2006.01)

(52) U.S. Cl.
CPC ................................ *G05B 13/0265* (2013.01)

(58) Field of Classification Search
CPC ................................................ G05B 13/0265
See application file for complete search history.

(56) References Cited

U.S. PATENT DOCUMENTS 6,123,910 A * 9/2000 Yoshii .................. B01D 53/346 423/244.01
6,200,543 B1 * 3/2001 Allebach ................ B01D 53/62 423/220
9,442,786 B2 * 9/2016 Singh .................. G06F 11/0772
(Continued)

FOREIGN PATENT DOCUMENTS

CN 104571066 A * 4/2015 ......... G05B 19/4184

*Primary Examiner* — Michael W Choi
(74) *Attorney, Agent, or Firm* — Perilla Knox & Hildebrandt; Kenneth A. Knox

(57) ABSTRACT

Techniques for a sophisticated closed-loop control system designed for the automatic regulation of SOx emissions in a Circulating Fluidized Bed Combustion (CFBC) boiler by leveraging the power of Adaptive Artificial Intelligence/Machine Learning (AI/ML) based control system, this innovative system ensures both real-time model training and implementation for dynamic and efficient SOx emission control. The present disclosure describes processing a current SOx emission, a current lime consumption value and a predefined SOx setpoint value to determine an optimal setpoint of lime consumption required to keep the SOx emission within a desired limit in real-time. Said processing includes determination of lime-SOx peak-trough curve, a response time of the boiler and the change in SOx to the change in lime. The lime consumption setpoint so determined is directly transmitted to a distributed control system to control the injection of lime in the CFBC boiler for automatic regulation of SOx emission control.

12 Claims, 5 Drawing Sheets

(56) References Cited

U.S. PATENT DOCUMENTS

| | | | | |
|---|---|---|---|---|
| 2010/0049369 | A1* | 2/2010 | Lou | G05B 17/02 700/274 |
| 2016/0158701 | A1* | 6/2016 | Brown | B01D 53/8631 110/345 |
| 2025/0109850 | A1* | 4/2025 | Kettunen | F22B 35/18 |

* cited by examiner

SYSTEM AND METHOD FOR AI/ML BASED CLOSED LOOP AUTOMATIC REGULATION OF EMISSIONS

FIELD OF THE INVENTION

Embodiments of the present disclosure relate generally to desulphurization, and more specifically to a system and method for determining optimal setpoint for lime using a closed loop control model-based technique backed by artificial intelligence and machine learning (AI/ML).

BACKGROUND OF THE INVENTION

Circulating Fluidized Bed Combustion (CFBC) boilers are designed for various fuel combinations of petroleum coke (petcoke), indian coal, imported coal, light cycle oil, refinery fuel gas etc. As Pet coke is an inhouse fuel and the production cost of petcoke is cheaper than other fuels, efforts are put into to running CFBC boilers on complete pet coke consumption. However, one of the major environmental issues with using pet coke alone as the preferred fuel in the CFBC boiler is the high Sulphur content in petcoke. Table 1 below depicts an analysis of various CFBC solid fuels and the emission thereof.

| Ultimate Analysis (As Received Basis (% By Weight) | | | |
|---|---|---|---|
| Ultimate Analysis | Indian Coal | Imported Coal | Petcoke |
| Carbon | 35.2 | 54.36 | 80.8 |
| Hydrogen | 2.4 | 3.66 | 5 |
| Nitrogen | 0.6 | 1.0 | 1.70 |
| Sulphur | 0.8 | 0.9 | 8.2 |
| Oxygen | 5.0 | 7.08 | 3.0 |
| Moisture | 14 | 23 | 0.3 |
| Ash | 42 | 10 | 1.00 |
| GCV (kcal/kg) | 3300 | 5100 | 8000 |

In addition, sulphur variability in petcoke as a feed is much higher than coal owing to the fact that coal is a naturally occurring resource whereas petcoke is more dependent on the type of crude oil used and the refining process used as different refining processes can remove different amounts of sulphur. Also, Petcoke sulphur is primarily present in organic form, while coal sulphur can be present in both organic and inorganic form. As organic sulphur is chemically bound to the coal matrix whereas inorganic sulphur is present as mineral impurities, removing organic sulphur is more difficult than inorganic sulphur. Further, the production of petcoke is not as well-controlled as the production of coal. Contrary to coal, Petcoke, is often produced as a byproduct of other processes, and there is less control over the production process. The sulphur content of petcoke also varies greatly due to the axial and radial process conditions of a delayed coker drum since the coking process is a complex reaction that is affected by a variety of factors, including temperature, pressure, and residence time. For instance, the axial temperature and pressure profiles in a delayed coker drum vary from top to bottom as the coke bed is constantly growing and shrinking with coke being deposited and removed and higher temperatures at the bottom of the drum favor the production of sulphur-rich petcoke. Therefore, the sulphur content of petcoke can vary significantly from batch to batch making it more difficult to control emission and ensure compliance with environment regulations as compared to other fuels. Considering the variability of sulphur content in petcoke, it is important to carefully monitor the sulphur content of petcoke and make adjustments to the combustion process accordingly to ensure compliance with environmental regulations. Thus, reactors fully operating on 100% petcoke face much variability in terms of sulphur and other properties, and developing a model for optimizing desulfurization efficiency is technically much more difficult that modeling a system purely based upon coal or other fuels.

Traditionally, a flue gas desulphurization (FGD) system works specifically on the flue gases generated from the reactor with the purpose to reduce the Sulphur Oxide (SOx) content with the help of a Lime based liquid slurry. The present disclosure is based on replacing the FGD with desulphurization in the reactor itself with no separate FGD system downstream. Powdered lime is used in boilers for flue gas desulphurization. Typically, lime is dosed through rotary air vanes through manual set point or auto set point or through cascade loop. Boilers are usually designed for capturing 96% amount of Sulphur with 64% lime to petcoke consumption ratio (18 tonnage per hour (TPH) lime consumption for a boiler).

A first step in capturing sulphur is limestone calcination. Calcination is an endothermic reaction i.e. requiring heat.

$$CaCO_3 \rightarrow CaO + CO_2 - 1782\ \text{kJ/kg}_{CaCO3}$$

$$MgCO_3 \rightarrow MgO + CO_2 - 1517\ \text{kJ/kg}_{MgCO3}$$

Sulphur released from fuel has to be oxidized before it can react with CaO $$S + O_2 \rightarrow SO_2$$

$$SO_2 + 1/2O_2 \leftrightarrow SO_3$$

Desulphurization releases heat and can be expressed as:

$$CaO + SO_3 \leftrightarrow CaSO_4 + 3689\ \text{kJ/kg}_{CaSO4}$$

Conventionally, lime dosing used in a system is in proportion with the existing level of SOx emission in one of the following modes: manual, automatic and cascade mode. Therefore, the highest amount of lime is dosed at corresponding highest values of SOx & vice versa. However, since said desulphurization is a chemical reaction, there would be a good response time for the lime to react which the Sulphur which results in a Peak-Trough arrangement of the lime-SOx system, thus implying that a lime peak now would result in a SOx trough at a later time. Then, since the controller would be feeding minimum lime at SOx trough, this again results in a SOx peak & the harmonic kind of trend hence continues like this.

Several other variables also contribute towards alternation of said peaks & troughs such as the petcoke sulphur & limestone ($CaCO_3$) content in lime, which cannot be measured in real time & the inherent effect thereof is observed only in terms of the Peak-Trough behavior.

The existing systems and methods used for desulphurization in reactors/boilers/plants are either based on open-loop mechanism where a control element is controlled by the operator or are dependent upon a large number of variables.

These systems require a minute-to-minute monitoring of the variables by a person specializing in observing the SOx emissions and determination of corresponding lime consumption values. Such continuous monitoring is not feasible even by an expert and is prone to human error.

Further, where systems based on closed loop control mechanism re used basis actual data, such systems either fail to employ AI/ML or use AI/ML for the purpose of advisory service alone and/or did not rely on AI/ML for processing related parameters of equipment. Additionally, even when the known mechanisms may estimate the set point in real-time, said mechanism fail to implement closed-loop in real-time as the determined set-points may have to be continuously pushed to the plant at predefined intervals. The standard control loops used may be based on distributed control system (DCS) controllers or Advanced process control (APC) solutions. The existing systems, thus, lack a mechanism for automatic regulation of SOx emission using an optimal consumption of lime in a circulating fluidized bed combustion that is based on AI/ML based closed loop control system, and is fully autonomous.

Furthermore, some of the existing systems for desulphurization employ a multivariate model for prediction of the limestone involving estimation/measurement of multiple parameters via approaches similar to soft sensor approach, thus, leading to higher error propensity and faulty recommendations. For instance, while modeling the FGD system, soft sensor modelling of the sulphur content requires soft sensor modeling of a large number of variables such as temperature, pressure, concentration and flow rate of inlet flue gas to the tower, temperature, pressure, concentration and flow rate of outlet flue gas from the tower, concentration, flow rate and particle size distribution of fresh limestone slurry fed in the tower, concentration, composition, flow rate and particle size distribution of recirculation limestone through pumps, temperature and flow rate of all inlet water, temperature, pressure and flow rate of air used etc. Since most of the above variables are required to be estimated, the multi-variate analysis approach suffers from disadvantages that a soft sensor model needs to be developed for each of the above variable, thus, requiring intense computational effort and that as a soft sensor model only provides estimation of the variables, relying the calculation on a host of soft sensor values may lead to grossly erroneous final result based on the following equation (1):

Max. error in dependent variable=(Error in dependent variable1)+(Error in in dependent variable2) . . . (Error dependent variable*n*) Equation (1)

In view of the above shortcomings, it is therefore desirable to develop a technique to achieve the SOx emissions within the value prescribed by a regulatory framework while optimizing the amount of lime consumption within the reactor/plant/boiler for improved desulphurization efficiency. It is further desirable that such a technique is self-learning, based on closed loop control mechanism and capable of calculating respective SOx peaks & troughs corresponding to a value of lime in real-time and determining an average value of SOx-Lime sensitivity as well as the response time of the reactor/plant/boiler in real-time. Furthermore, it is desirable to achieve a technique to determine an optimum value of lime consumption which is based on a closed-loop control mechanism such that the need for intermediate layers (e.g. advanced process control/real-time optimization APC/RTO) between the lowest level control layer (e.g. distributed control system layer) in a manufacturing plant and the control system is eliminated. Moreover, it is desired that such systems deploy AI/ML to control the output set values more precisely and anticipate in advance the behaviour of the equipment. Yet another objective in view of the drawbacks of existing system is a technique that is more accurate and simpler, for instance based on more accurate bi-variate model (employing peak & trough arrangement) as compared to the multi-variate approach.

SUMMARY OF THE INVENTION

This section is provided to introduce certain objects and aspects of the disclosed methods and systems in a simplified form that are further described below in the detailed description. This summary is not intended to identify the key features or the scope of the claimed subject matter.

To overcome the shortcomings of existing techniques as discussed in the background section, a system and method for real-time closed loop automatic regulation of SOx emission in a CFBC boiler by an artificial intelligence/Machine learning (AI/ML) based model is presented.

In view of these and other objects, the present invention relates to a method for closed loop automatic regulation of SOx emission in a Circulating Fluidized Bed combustion (CFBC) boiler by an artificial intelligence/Machine learning (AI/ML) based control system. The method implemented by at least a processor comprises obtaining operation data comprising values of a current SOx emission and lime in a time-series from one or more field sensors in a CFBC boiler in real-time. The method further comprises processing the operating data, by a lime dosage AI/ML prediction model hosted in the control system, to determine an optimal setpoint of lime consumption required to keep the SOx emission within a desired limit in real-time. The determination of optimal setpoint of lime is based on a current value of a SOx emission and lime consumption and a predefined SOx setpoint value. The optimal setpoint of lime consumption so determined is directly transmitted to a distributed control server (DCS) through an open platform communications (OPC) server. The optimal setpoint of lime received from the DCS is injected in the CFBC boiler for automatic regulation of SOx emission control.

In another exemplary embodiment, an artificial intelligence/Machine learning (AI/ML) based control system for closed loop automatic regulation of SOx emission in a Circulating Fluidized Bed combustion (CFBC) boiler is described. Said control system comprises a receiving module to obtain operation data comprising values of a current SOx emission and lime in a time-series from one or more field sensors in a CFBC boiler in real-time, a lime dosage AI/ML prediction model to process the operating data to determine an optimal setpoint of lime consumption required to keep the SOx emission within a desired limit in real-time, based on a current value of a SOx emission and a lime consumption value and a predefined SOx setpoint value. The system further comprises an output module to output the optimal setpoint of lime consumption directly to a distributed control system (DCS) through an open platform communications (OPC) server, wherein the optimal amount of lime received from the DCS is injected in the CFBC boiler for automatic regulation of SOx emission control.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated herein, and constitute a part of this invention, illustrate exemplary embodiments of the disclosed system and method in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that drawings of the invention include disclosure of electrical components or circuitry commonly used to implement such components.

DETAILED DESCRIPTION

Figure 1:
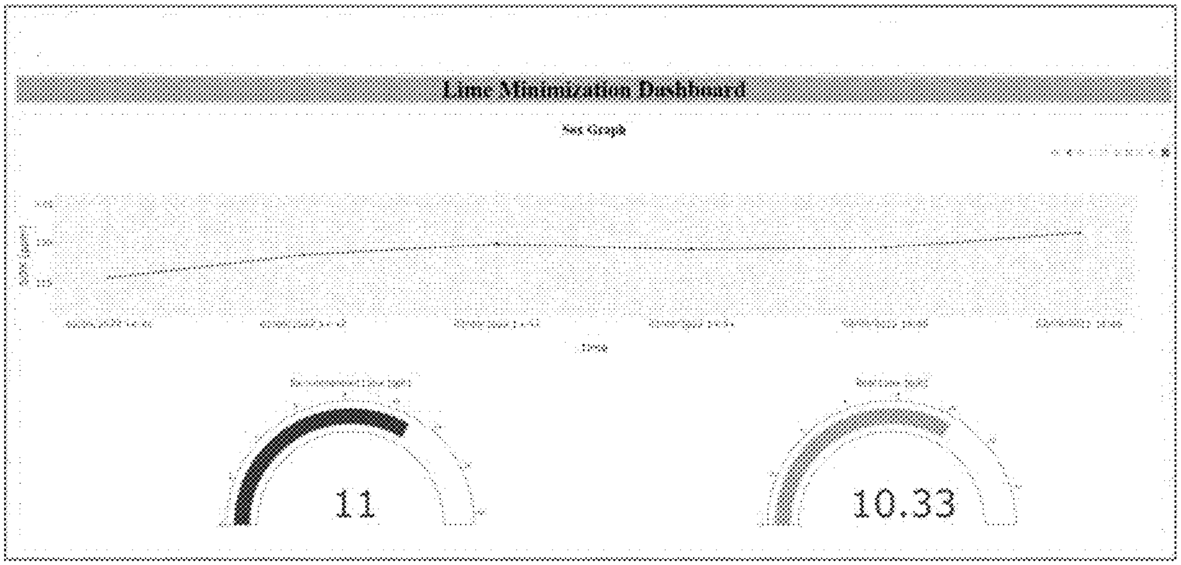
FIG. 1 illustrates an exemplary graphical interface of a dashboard to depict the gap between the value of lime determined by a conventional open loop system of desulphurization and a desired value of lime over a given period of time.

In the following description, for the purposes of explanation, numerous specific details have been set forth in order to provide a description of the invention. It will be apparent, however, that the invention may be practiced without these specific details and features.

An element may contain any structure arranged to perform certain operations. As required for a given set of design parameters or performance constraints, each element can be implemented as hardware, software, or any combination thereof. Although embodiments may be described by way of example with a limited number of elements in a particular topology, embodiments may include more or fewer elements in alternative topologies as required for a given implementation. It is worth noting that for "one embodiment" or "embodiment" any reference means that a particular feature, structure, or characteristic described in connection with the embodiment is included in at least one embodiment. The appearances of the phrases "in one embodiment", "in some embodiments", in various places in the specification are not necessarily all referring to the same embodiment.

The specification may refer to "an", "one" or "some" embodiment(s) in several locations. This does not necessarily imply that each such reference is to the same embodiment (s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, whose implementation may differ from what is shown. The connections shown are logical connections; the actual physical connections may be different. It is apparent to a person skilled in the art that the structure may also comprise other functions and structures. It should be appreciated that the functions, structures, elements and the protocols used in communication are irrelevant to the present disclosure. Therefore, they need not be discussed in more detail here.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

The present disclosure relates to an artificial intelligence/Machine learning (AI/ML) based control system for closed loop automatic regulation of SOx emission in a Circulating Fluidized Bed combustion (CFBC) boiler and the method thereof.

FIG. 1 illustrates an exemplary graphical interface of a dashboard to depict a gap between the value of lime determined by a conventional open loop system for desulphurization and a desired value of lime over a given period of time. As shown in FIG. 1, a lime minimsation dashboard displays a graph of a SOx emission value in ppm as ordinate and corresponding time values as abscissa. The recommended value of lime as per the conventional open loop based system is 11, whereas an optimal value of lime is 10.33, thus, highlighting a gap between the value of lime used for desulphurization based on existing system and an optimal value for desulphurization.

Figure 2:
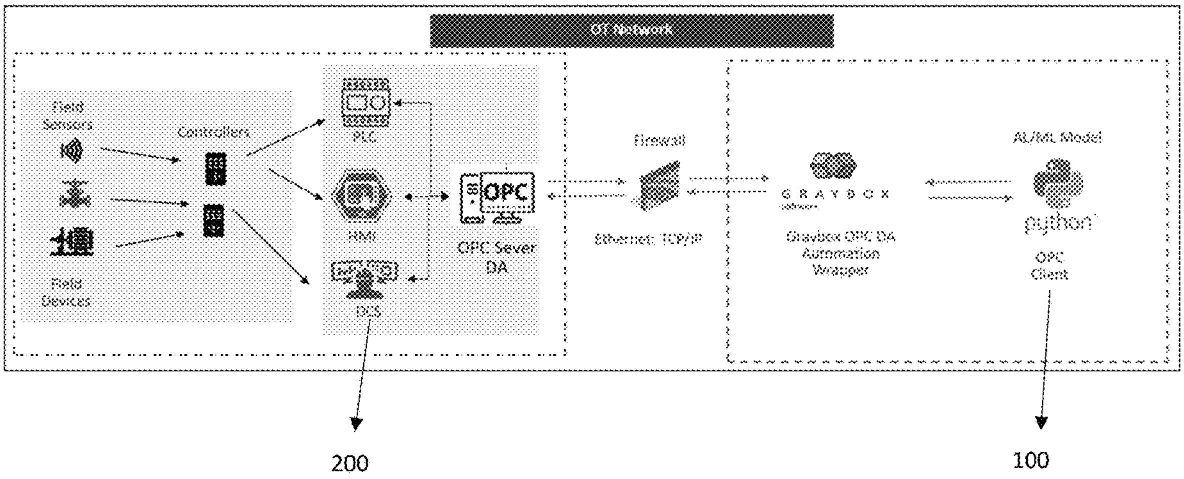
FIG. 2 illustrates an exemplary operational technology network environment including a system for automatic regulation of SOx emission in a Circulating Fluidized Bed combustion (CFBC) boiler, in accordance with an embodiment of the present disclosure.

FIG. 2 depicts a data architecture for an end-to-end scheme for automatic regulation of SOx emission in a CFBC boiler in real-time using a closed loop control mechanism. As shown in FIG. 2, the operational technology (OT) network comprises one or more field sensors, actuators and field devices, controllers at the reactor/boiler, a PLC, a HMI, a DCS and OPC server DA connected to an AI/ML based control system (OPC Client). The field sensors, field devices and actuators are used for obtaining real-time data of process parameters within the plant/reactor/boiler. A PLC is a programmable logic controller that can handle binary input and output of logic statement stored in an associated memory. The status of the PLC and process can be graphically visualized in a Human Machine Interface (HMI) such that for a command given to the PLC, the corresponding output may be viewed in the HMI. A Distributed Control System (DCS) is an automated control system used for monitoring and providing instructions to field sensors and actuators through controller for making the required changes to process parameters. The OPC DA server as shown in FIG. 2 provides a standard interface for accessing real-time data from the above-discussed industrial devices, wherein the OPC DA server collects data from said devices and makes it available to OPC DA clients. The OPC Client is in a client-server architecture with the OPC DA server and accesses the data through OPC DA server. In the exemplary architecture shown in FIG. 2, the OPC Client employ Python and Python based AI/ML applications. Network Connectivity used may be ethernet connectivity with TCP/IP Protocol to connect the OPC DA Server and OPC client directly on same network switch or router. The network may be a wireless network, a wired network, or a combination thereof. The network may be implemented as one of the different types of networks, such as intranet, local area network LAN, wide area network WAN, the internet, etc. The network may either be a dedicated network or a shared network. The shared network may represent an association of the different types of networks that use a variety of protocols e.g., Hypertext Transfer Protocol HTTP, Transmission Control Protocol/Internet Protocol TCP/IP, Wireless Application Protocol WAP, etc. to communicate with one another. Further, the network may include a variety of network devices, including routers, bridges, servers, computing devices, storage devices, etc.

The OPC DA server and OPC client may be connected over a network with necessary firewall permissions and port configurations over both the OPC DA server and OPC client. The exemplary embodiment of FIG. 2 displays a GrayBox open platform communications (OPC) automation wrapper for communication between an OPC Client and OPC server such as through DCOM settings. Data Retrieval and Write-back may be through OPC client library (like OpenOPC in Python). Error handling mechanisms are used for error Management using robust error handling mechanisms and logging practices.

The present invention encompasses a data processing pipeline to obtain values of SOx & lime values in real-time as input for the control system. The OPC client hosts a control system. The description of the control system will be discussed with reference to FIG. 3.

The values of SOx and lime are obtained in real-time through one or more field sensors and field devices at the boiler using one or more controllers. The DCS transmits said values of SOx and lime directly to the control system through the OPC server. The control system is an AI/ML based closed loop control system and hosts a self-learning lime dosage prediction model. The values of SOx and lime are used by the control system to determine (i) peaks/trough of SOx values in real time, (ii) a difference between the current SOx value and the pre-defined SOx set point value and (iii) average corresponding SOx-lime sensitivity. The SOx-lime sensitivity at a given time refers to the time taken for lime to react with and absorb/desulphurize completely the amount of Sulphur present in the boiler at said time. In the closed-loop control, the operating data is checked and compared to the setpoint of lime determined by the AI/ML based control system. The control system then calculates a setpoint of lime dosage required to keep the SOx emission at or below a pre-defined SOx set point, for example, 100 ppm based on the peaks/trough of SOx values and the SOx-lime sensitivity and the pre-defined SOx set point. The AI/ML based control system is configured to continuously develop a correction for any anticipated excursion of the temporal SOx fluctuation from the intended value of SOx emission. The value of lime setpoint so determined by the AI/ML based control system is transmitted directly to the DCS through an OPC server, wherein the optimal amount of lime received from the DCS is injected in the CFBC boiler for automatic regulation of SOx emission control. This provides the advantage of eliminating the need for any middle or intermediate layers typically employed in a manufacturing system such as APC/RTO to perform the desulphurization process. Another advantage is the reduction achieved in both the Lime/Petcoke ratio (L/C) as well as number of deviations of SOx from the desired/pre-defined SOx set point value.

That is, the AI/ML based control system establishes a closed loop control with the DCS directly, automatically controls the lime injection by receiving the operating data from the DCS and sending a determined lime dosage set-point directly to the DCS through OPC DA Server to maintain the SOx emission within the predefined SOx set-point value. The lime injection may be performed in the CFBC boiler in real-time by a PID controller of lime RAV under the control of direction from the DCS. The controllers are automatically adjusted to bring the process back to the setpoint. The injection of lime as per the lime dosage setpoint received from the control system may be in the form of solid limestone along with petcoke.

Table 2 below covers exemplary field sensors, the operating data (SOx, Lime Dosing) and an SOx emission set-point which is read through controllers to the DCS and thereafter transmitted from the DCS to the OPC DA Server in real-time. In an exemplary embodiment, the frequency at which read data is updated in real-time in DCS may be one minute. Data from OPC DA Server is extracted to OPC Client (here it is Python based AI/ML model) through TCP/IP Protocol. After operating data and SOx setpoint is read into the OPC Client and saved on the database, required processing is done using the AI/ML based lime dosage prediction model to determine an optimal setpoint of lime consumption. Said optimal set point of lime consumption may be transmitted to the DCS through OPC DA Server again at a frequency of one minute. The DCS server may then set a value of the optimal lime setpoint directly at the PID controller, which follows the same protocol as the protocol used for reading the data from DCS. That is, the data processing pipeline shown in figure achieves a real-time closed loop implementation as read and write is happening at a frequency same at which DCS is receiving the data from field sensors. The AI/ML based lime dosage prediction model is adaptive and self-learning in real-time.

TABLE 2

Field Sensor and Process Data Tags

| S. No. | Field_Tag_ Name | Description | Data Frequency | Read/ Write |
|---|---|---|---|---|
| 1 | 12AI1101.PV | UB5 SOx Analyzer | 1 minute | Read |
| 2 | 12AIC1801.PV | UB5 Lime Consumption | 1 minute | Read/ Write |
| 3 | 12AIC1101.SV | UB5 SOx Set_Point | 1 minute | Read |
| 4. | ML-LIVE.DT01 | UB5 ML_ Recommended_Lime | 1 minute | Write |

TABLE 2-continued

| Field Sensor and Process Data Tags | | | | |
|---|---|---|---|---|
| S. No. | Field_Tag_ Name | Description | Data Frequency | Read/ Write |
| | | Consumption | | |
| 5. | 13AI1101.PV | UB6 SOx Analyzer | 1 minute | Read |
| 6. | 13AIC1801.PV | UB6 Lime Consumption | 1 minute | Read/ Write |
| 7. | 13AIC1101.SV | UB6 SOx Set_Point | 1 minute | Read |
| 8. | ML-LIVE.DT02 | UB6 ML_ Recommended_Lime Consumption | 1 minute | Write |

The present disclosure further encompasses monitoring the communication link between the AI/ML based control system and the DCS. The monitor may be hosted at the control system. In a different embodiment, the monitor is hosted at the DCS. In another embodiment, the monitor is implemented in a distributed scheme over the control system and the DCS. In the event the monitor fails to report the status of the communication link for a defined period of time, e.g. 180 seconds, the mode of operation may be automatically changed from a Remote cascade mode or automatic mode to a manual mode with alarm in which a set value to control the lime dosage may be input manually by a skilled operator till the communication link is re-established. The Control system facilitates a graphical user interface where if the DCS CAS mode set value is determined to have a deviation of greater than 2.5 TPH from the set value achieved under automatic or RCAS mode, changing of mode may not be allowed till the difference value under 2.5 TPH is achieved. Accordingly, to maintain the difference, an operator may select a manual mode & control the set value before changing in RCAS or CAS mode. AI/ML closed-loop scheme has been implemented for both the boilers (UB5 & UB6) now.

The present disclosure also encompasses that the DCS has a switching module to enable changing the mode of operation from a remote cascade (RCAS) to cascade (CAS) and vice versa. The switching module, thus, provides an ease of operation to the operator by enabling the operator to change the mode as per the process demand at the time of start-up of the boiler or the plant or in any required condition such as failure or interruption of a communication link between the AI/ML based control system and the DCS.

The AI/ML based control system is in a closed loop with the DCS such that the control system and the DCS maintain a seamless communication flow from the transmission of operating data from the DCS to transmission of lime dosage setpoint from the control system and automatic regulation of SOx emission in accordance with the setpoint. Such communication flow is performed continuously in real-time or at fixed durations.

Figure 3:
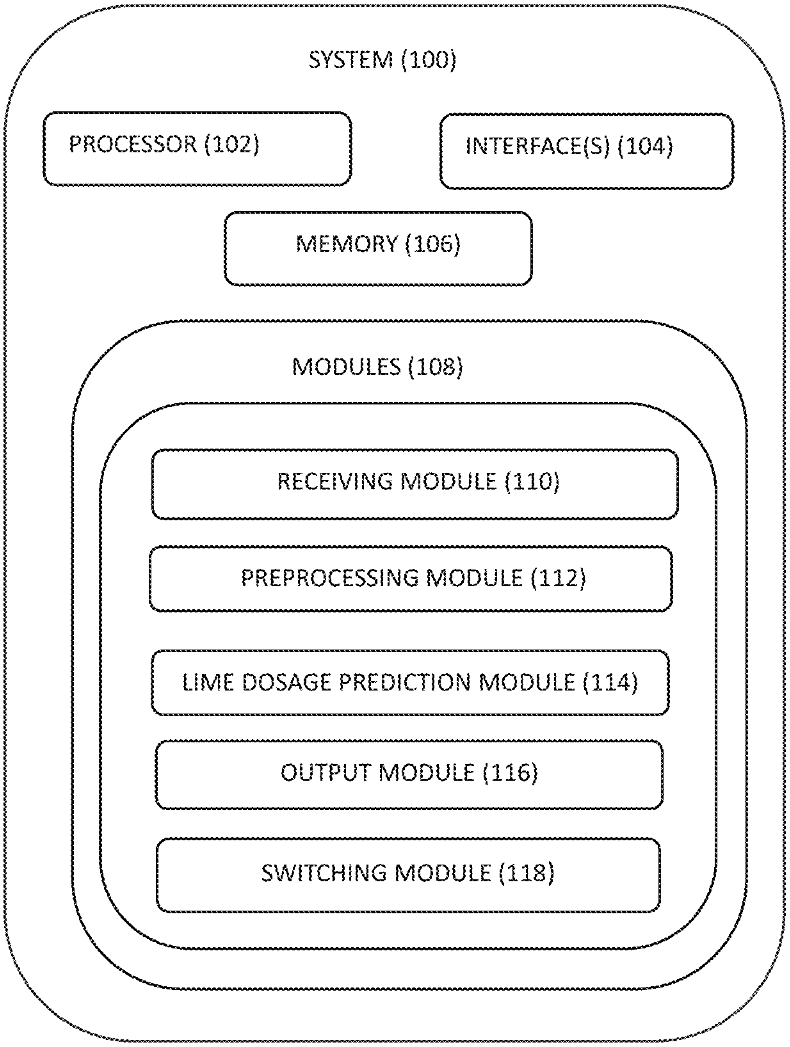
FIG. 3 illustrates a block diagram depicting the components of the system for automatic regulation of SOx emission in a Circulating Fluidized Bed combustion (CFBC) boiler, in accordance with an embodiment of the present disclosure.

FIG. 3 illustrates a block diagram of an exemplary AI/ML based control system 100 for closed loop automatic regulation of Sox emission in a Circulating Fluidized Bed combustion (CFBC) boiler. While the present disclosure is explained considering that the system 100 is implemented on a client device (OPC client), the system 100 may be implemented in a variety of computing systems, such as a laptop computer, a desktop computer, a notebook, a workstation, a mainframe computer, a network server, a portable electronic device and the like. In one embodiment, system 100 may be implemented in a cloud-based environment. The control system 100 is accessed by the DCS and the application residing thereon through the OPC DA server.

In one embodiment, the control system 100 may include at least one hardware processor 102, an input/output I/O interface 104, a memory 106, and one or more modules 108 including a receiving module 110, a pre-processing module 112, a lime dosage prediction module 114, an output module 116 and a switching module 118. The at least one hardware processor 102 may be implemented as one or more microprocessors, microcomputers, microcontrollers, digital signal processors, central processing units, state machines, logic circuitries, and/or any devices that manipulate signals based on operational instructions. Among other capabilities, the at least one hardware processor 102 may be configured to fetch and execute computer-readable instructions stored in the memory 106.

The I/O interface 104 may include a variety of software and hardware interfaces, for example, a web interface, a graphical user interface, etc. The I/O interface 104 may allow the system 100 to interact with the DCS through OPC DA server. Further, the I/O interface 104 may enable the system 100 to communicate with other computing devices, such as web servers and external data servers not shown. The I/O interface 104 can facilitate multiple communications within a wide variety of networks and protocol types, including wired networks e.g. LAN, cable networks, etc. and wireless networks e.g., WLAN, cellular networks, or satellite networks. The I/O interface 104 may include one or more ports for connecting a number of devices to one another or to another server.

The memory 106 may include any tangible, non-transitory computer-readable medium or computer program product known in the art including, for example, volatile memory, such as static random access memory SRAM and dynamic random access memory DRAM, and/or non-volatile memory, such as read only memory ROM, erasable programmable ROM, flash memories, hard disks, optical disks, and magnetic tapes. The memory 106 stores the process data including the operation data fetched from the DCS used to predict the lime consumption setpoint.

The receiving module 110, the preprocessing module 112, the lime dosage prediction module 114, the output module 116 and the switching module 118 are in communication with the at least one hardware processor 102 and perform particular tasks or functions.

To facilitate automatic regulation of Sox emission within the CFBC boiler, the receiving module 110 receives a request for obtaining operation data and a Sox setpoint value. The receiving module 110 is configured to obtain the operating data from the DCS, acting as the data source, in time-series. The DCS obtains the operation data, through the controller(s), from the field sensors deployed within the boiler. The Sox setpoint value may be predefined in accordance with the environment regulations.

The preprocessing module 112 is configured to preprocess the operation data so as to prepare the operation data for further processing by the lime dosage prediction model. Preparing the operation data includes detecting outliers and substituting missing values using appropriate machine learning methods. The preprocessing module 112 is further configured to feed the cleaned operating data to the lime dosage prediction module 114.

The lime dosage prediction module 114 is configured to process the received data to determine the optimal setpoint of lime for the received amount of sulphur required for desulphurization by the boiler in real-time. Specifically, the lime dosage prediction module 114 is configured to determine an optimal peak and trough for a predefined time interval, a difference between the current Sox value and the predefined Sox set-point value and a Sox-lime sensitivity. The determination of optimal lime set point is, thus, based on said optimal peak and trough curve, the deviation between the current Sox value and the predefined Sox set-point value and the Sox-lime sensitivity. Said process is re-iterated continuously, e.g. 30 seconds or 60 seconds to reach a global minimum for lime and equilibrium for sulphur.

Figure 4:
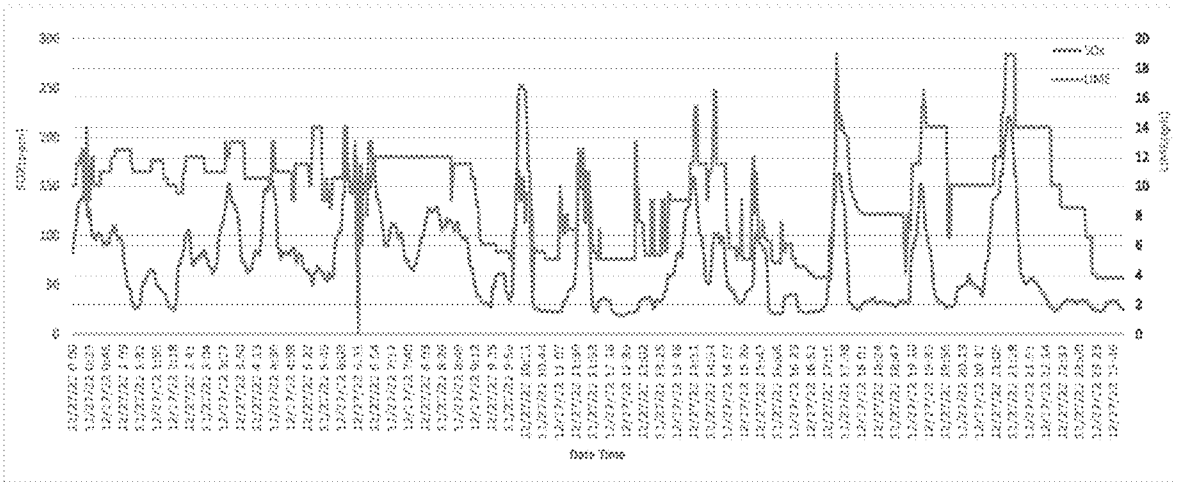
FIG. 4 illustrates an exemplary Peak-Trough curve corresponding to lime-SOx amounts during operation of a plant over a time interval, in accordance with an exemplary embodiment of the present disclosure.

The lime dosage prediction module 114 is a self-learning AI/ML based model that is trained by analyzing a historical time series operating data corresponding to SOx and lime peaks and troughs and an optimal amount of lime determined by the module 114 to determine SOx-lime sensitivity. Specifically, in FIG. 4, a typical lime-SOx curve formed during operations of a reactor/boiler/plant is shown. Due to variations in lime dosage, variation of other variables such as petcoke sulphur content, active lime composition in limestone and the reactor lag, the SOx curve goes through a peak & trough arrangement. Peak is characterized by monotonic increase of X points followed by decrease of Y points. Similarly, trough is characterized by monotonic decrease of X points followed by increase of Y points. These $X_n$ point may differ for limestone & SOx respectively. That is, as depicted in FIG. 4, a lime peak would correspond to a SOx trough later owing to the reactor response time. The peak trough correspondence needs to be determined by the following steps— a) Analyzing historical operating data e.g. the operating data of the reactor for the past years to understand the range of response time (ranging between t1 & t2)
b) Calculating by the lime dosage prediction module the response/residence time of the reactor/plant/boiler based upon the prevailing conditions.

Once the peak-trough correspondence has been established using points a) and b), next, the lime dosage prediction module 114 is configured to determine the SOx-lime sensitivity as the change in SOx based upon the change in Lime. The SOx-lime sensitivity in real-time may be determined based upon the last m peak trough correspondence. As explained above, based upon the requirements of the plant operations, the lime dosage prediction module 114 tries to keep lime flow (tph) by employing learnings based upon last p peak-trough correspondence & prevailing sensitivity in accordance with the following equation:

$$\text{Lime dosage}=\text{Average of last } n(\text{Peak/trough Lime})+\text{real time sensitivity}*(\text{SOx setpoint}-\text{actual SOx}) \quad \text{Equation (2)}$$

The lime dosage prediction module (114) is further configured to continuously correct the value of optimal setpoint of lime consumption according to any anticipated deviation of a temporal SOx value from an intended value i.e. predefined SOx emission set point.

The lime dosage prediction module 114 is configured to perform a bi-variate analysis which utilizes just two variables, namely, lime dosage (ton/hr) & actual SOx emission amount (ppm). The bi-variate analysis by the lime dosage prediction module 114 provides various advantages over a multi-variate approach as no soft sensor is employed to make any estimation and the current as well as historical values are accurately available (within the limit of measurement error of the system). Further, since there is no soft sensor employed, the errors which get cascaded due to the errors in each dependent variable are no longer there. Furthermore, the computation effort as well as complexity requirements are much lesser.

The control system 100 further comprises an output module 116 configured to output the optimal setpoint of lime consumption determined by the lime dosage prediction module 114 directly to the DCS through the OPC server. The DCS then controls the injection of the lime in the CFBC boiler in accordance with the optimal setpoint received from the control system 100. The injection of lime in accordance with the optimal setpoint enables the desulphurization efficiency of the plant to be accurately controlled, such that the operation cost of the plant is reduced, and pollution is reduced. The automatic control of lime injection may be performed by a Proportional Integral Derivative (PID) controller of a Lime Rotary Airlock valve (RAV) which controls the distribution of lime in the CFBC boiler under the direction of the DCS.

The control system 100 further comprises a comprising a switching module 118 configured to enable switching of a mode of operation from RCAS to CAS or from RCAS to a manual mode when a communication between the AI/ML based control system and the DCS is determined to be interrupted.

The control system 100 encompasses monitoring a communication link between the AI/ML based control system and the DCS and on determination of an interruption in the communication link, the switching module may be operated upon to switch the mode of operation to CAS until all the conditions are met e.g. a deviation is within a predefined allowed limit and the communication link is established.

The AI/ML based control system 100 is configured to be responsible for the optimization of the boiler/plant/reactor operation by performing in a closed loop control operation with the DCS such that the communication between the AI/ML based control system 100 and the DCS is seamless and direct without involving any intermediate control layer. The processing of operation data and implementation of the lime setpoint may be performed continuously in real-time or repeated after a fixed duration.

Figure 5:
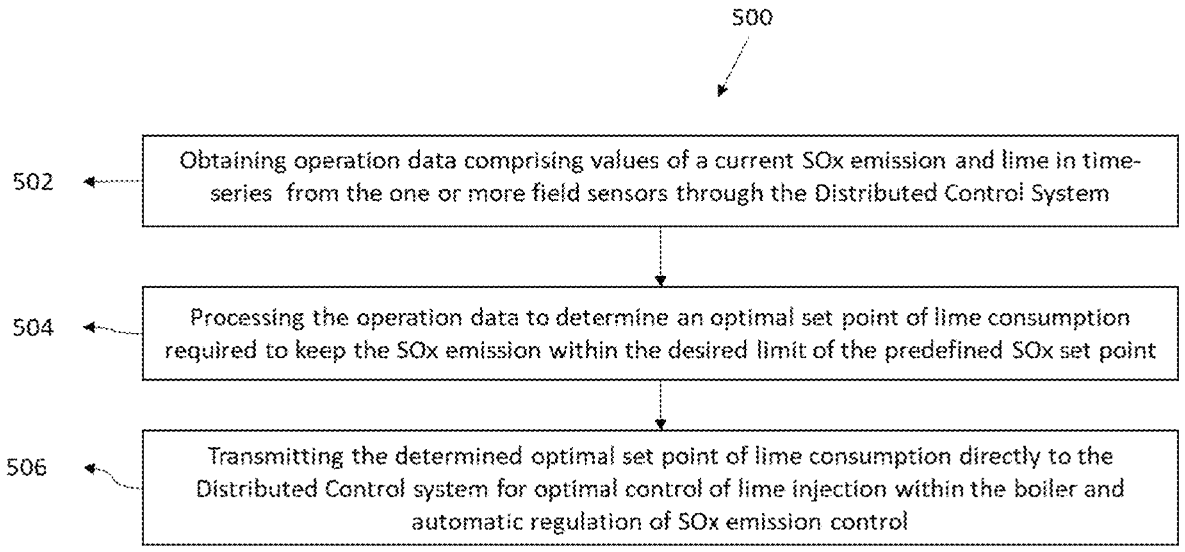
FIG. 5 illustrates an exemplary method for automatic regulation of SOx emission in a Circulating Fluidized Bed combustion (CFBC) boiler, in accordance with an exemplary embodiment of the present disclosure.

FIG. 5 shows an exemplary flow chart of a method 500 for closed loop automatic regulation of SOx emission in a CFBC boiler by an artificial intelligence/Machine learning (AI/ML) based control system shown in FIG. 3. The method initiates at step 502 with a control system obtaining operation data comprising values of a current SOx emission and lime in a time-series from one or more field sensors in a CFBC boiler in real-time along with a pre-defined SOx setpoint value.

At step 504, the method comprises processing the operating data by an AI/ML based lime dosage prediction model to determine an optimal setpoint of lime consumption required to keep the SOx emission within a desired limit based on the current value of a SOx emission and lime consumption and a predefined SOx setpoint value (desired limit). Processing the operation data of the CFBC boiler includes determining a peak and trough value of SOx in real-time, a difference between the current SOx value and the predefined SOx set-point value and a SOx-lime sensitivity.

At step 506, the optimal setpoint of lime consumption is transmitted to the DCS through OPC Server where the DCS controls the injection of the lime in the CFBC boiler in accordance with the received optimal setpoint. Under the direction of the DCS, the automatic control of lime injection may be performed by a Proportional Integral Derivative (PID) controller of a Lime Rotary Airlock valve (RAV) which controls the distribution of lime in the boiler.

The method 500 further also encompasses continuous correction of the optimal set point by the AI/ML based lime dosage prediction module on detection of an anticipated deviation of a temporal SOx value from the intended predefined SOX setpoint value.

As a person skilled in the art will recognize from the previous detailed description and from the figures and claims, modifications and changes can be made to the preferred embodiments of the invention without departing from the scope of this invention defined in the following claims.

While the technology covered in the present disclosure may specifically be employed for Power sector Lime & SOx deviations minimization, the closed loop automatic regulation of process parameters by an artificial intelligence/Machine learning (AI/ML) based control system loop is capable of being uniquely implemented and has applications across the industries. The industrial applications that may be improved by this invention include in-house optimization of several refinery, petrochemicals, manufacturing processes by directly controlling DCS with the AI/ML backed control system described above.

Although the present invention has been described in considerable detail with reference to certain preferred embodiments and examples thereof, other embodiments and equivalents are possible. Even though numerous characteristics and advantages of the present invention have been set forth in the foregoing description, together with functional and procedural details, the disclosure is illustrative only, and changes may be made in detail, especially in terms of the structuring and implementation within the principles of the invention to the full extent indicated by the broad general meaning of the terms. Thus, various modifications are possible of the presently disclosed system and method without deviating from the intended scope of the present invention.

We claim:

1. A method for closed loop automatic regulation of SOx emission in a Circulating Fluidized Bed combustion (CFBC) boiler by an Artificial Intelligence/Machine learning (AI/ML) based control system, the method comprising:

obtaining, by a processor implemented in hardware, an operation data comprising values of a current SOx emission and lime in a time-series format from one or more field sensors in a CFBC boiler in real-time;

processing, by the processor, the operation data to determine an optimal setpoint of lime consumption required to keep the SOx emission within a desired limit in real-time, based on a current value of a SOx emission and lime consumption and a predefined SOx setpoint value, wherein the processing comprises determining a peak and trough value of SOx in real-time, a difference between the current SOx value and the predefined SOx set-point value and a SOx-lime sensitivity, wherein the processing comprises analyzing historical time series operation data corresponding to SOx and lime peaks and troughs to determine a SOx lime sensitivity and the determined optimal amount of lime; and transmitting, by the processor, the optimal setpoint of lime consumption directly to a distributed control system (DCS) through an open platform communications (OPC) server, wherein the optimal setpoint of lime received from the DCS is injected in the CFBC boiler for automatic regulation of SOx emission control.

2. The method as claimed in claim 1, further comprising continuously correcting value of optimal setpoint of lime consumption according to any anticipated deviation of a temporal SOx value from the desired value.

3. The method as claimed in claim 1, further comprising monitoring a communication link between the AI/ML based control system and the DCS.

4. The method as claimed in claim 3, further comprising switching a mode of operation to a manual mode with an alarm when a communication between the control system and the DCS is determined to be interrupted.

5. The method as claimed in claim 1, wherein the automatic control of lime injection is performed by a Proportional Integral Derivative (PID) controller of a Lime Rotary Airlock valve (RAV) which controls the distribution of lime.

6. The method as claimed in claim 1, wherein the automatic control of lime injection is performed in a closed loop structure with direct seamless communication flow between the DCS and the AI/ML based control system such that the processing of operation data is performed continuously or is repeated after a fixed duration.

7. An artificial intelligence/Machine learning (AI/ML) based control system for closed loop automatic regulation of SOx emission in a Circulating Fluidized Bed combustion (CFBC) boiler, the system comprising:

a processor implemented in hardware and a memory comprising program instructions executable by the processor that, when executed, direct the processor to:

obtain an operation data comprising values of a current SOx emission and lime in a time-series from one or more field sensors in a CFBC boiler in real-time;

process the operation data to determine an optimal setpoint of lime consumption required to keep the SOx emission within a desired limit in real-time, based on a current value of a SOx emission and a lime consumption value and a predefined SOx setpoint value, wherein the processor determines a peak and trough value of SOx in real-time, a difference between the current SOx value and the predefined SOx set-point value and a SOx-lime sensitivity, wherein the processor analyzes historical time series operation data corresponding to SOx and lime peaks and troughs to determine a SOx lime sensitivity and the determined optimal amount of lime; and output the optimal setpoint of lime consumption directly to a distributed control system (DCS) through an open platform communications (OPC) server, wherein the optimal amount of lime received from the DCS is injected in the CFBC boiler for automatic regulation of SOx emission control.

8. The system as claimed in claim 7, wherein the processor is further directed to continuously correct value of optimal setpoint of lime consumption according to any anticipated deviation of a temporal SOx value from the desired value.

9. The system as claimed in claim 7, wherein the communication link between the AI/ML based control system and the DCS is continuously monitored.

10. The system as claimed in claim 9, wherein the processor is configured to switch a mode of operation to a manual mode when a communication between the AI/ML based control system and the DCS is determined to be interrupted.

11. The system as claimed in claim 7, wherein the automatic control of lime injection is performed by a Proportional Integral Derivative (PID) controller of a Lime Rotary Airlock valve (RAV) which controls the distribution of lime in the CFBC boiler.

12. The system as claimed in claim 7, wherein the control system is in a closed loop control operation with the DCS and maintains a direct seamless communication flow with the DCS such that the processing of operating data is performed continuously or is repeated after a fixed duration.

* * * * *